Jan. 4, 1938. C. SCOTT 2,104,057
METHOD OF APPLYING FILMS MADE FROM VISCOSE TO PAPER AND THE LIKE
Filed April 14, 1933
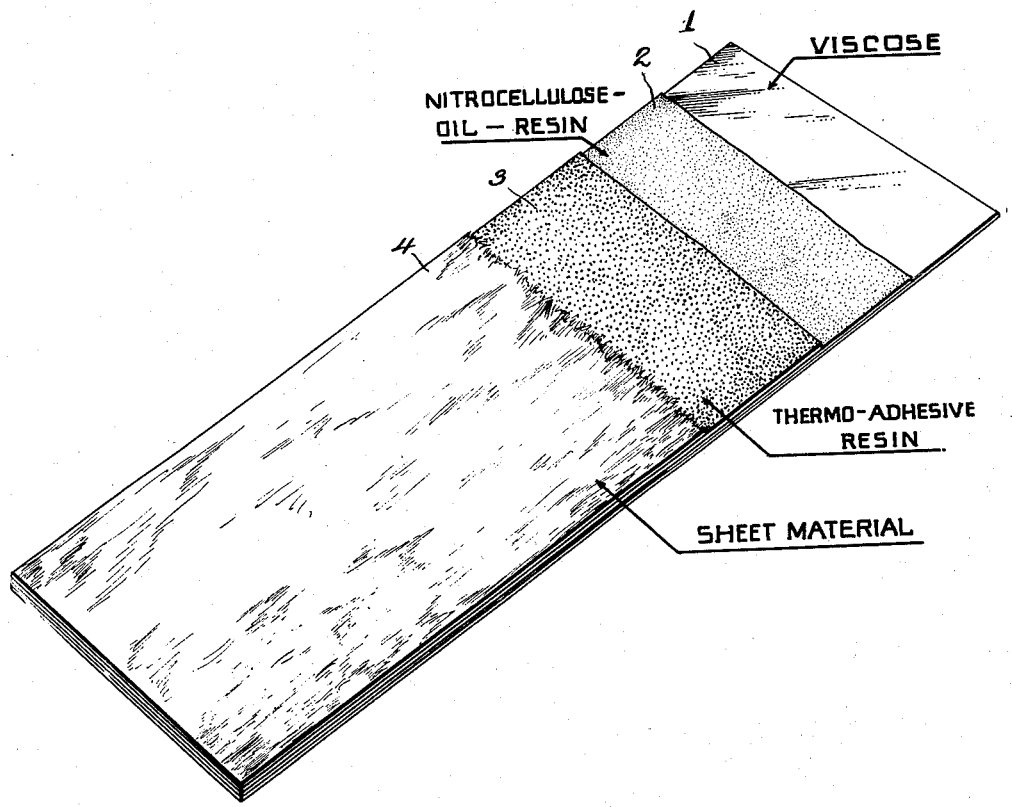

Patented Jan. 4, 1938

2,104,057

UNITED STATES PATENT OFFICE 2,104,057

METHOD OF APPLYING FILMS MADE FROM VISCOSE TO PAPER AND THE LIKE

Clyde Scott, Newark, N. J.

Application April 14, 1933, Serial No. 666,212

29 Claims. (Cl. 154—40)

The following described invention relates to novel and improved methods of rendering films made from viscose adherent so that they may be applied to other material as coatings or the like. It is well recognized that viscose or regenerated cellulose film has a surface which resists attempts to cause this material to adhere to other materials. For example, it is a matter of great difficulty to provide a close and permanent bond between a film made of viscose and a sheet of paper, fabric or the like. This disadvantage is not overcome successfully by the application of a single coating of liquid or solid adhesives as the bond or weld between them and the surface of the film made from viscose is not permanent to a satisfactory degree.

One of the objects of my invention is to coat the film made from viscose with a solution which forms a permanent bond with the film and in turn affords a satisfactory attaching surface for adhesives.

Another object of my invention is to adapt a solid synthetic resin of the type which becomes adhesive under the influence of heat, to use with a film of the resistant properties of film made from viscose or regenerated cellulose.

A further object of my invention is to provide a method by which a sheet of fibrous material such as paper or stranded materials such as fabric may be coated with a film of the properties possessed by films made from viscose. As an incident of this process the substances used intermediate the paper and fabric on the one hand and the film made from viscose on the other, shall contribute desirable properties not possessed by either the film made from viscose or the sheet material to which it is attached.

By way of example, the preferred embodiment of my invention and the details of this process are illustrated in the attached drawing.

Viscose which is a common form of soluble cellulose is well adapted to the production of filaments and sheets or films of regenerated cellulose. Such a film 1 is shown in the drawing. It is this film which it is intended to use as a coating upon other sheet material.

It is characteristic of films made from viscose that its surface repells many of the commonly known adhesives or bonding materials whether they be in solid or liquid form.

I have discovered that this repellent surface of the films made from viscose film may be substantially done away with and overcome by giving the cellulose film an appropriate coating. Such a coating is a lacquer solution formed of low viscosity nitro-cellulose to which polymerized linseed oil has been added in an amount approximately equal to the quantity of the dry weight of the cellulose. A suitable plasticizer may be added as desired and for this purpose I make use of glycerol-phthalate resin, phosphoric acid ester or the like. A small amount of gum chicle or its equivalent is also added to improve the bond between this coating and the viscose.

The above named materials are dissolved in a solvent such as amyl acetate. Suitable diluents may be used with the amyl acetate and toluol is effective for this purpose. It is sometimes found advisable to add a small quantity of a homogenizer such as amyl alcohol or fusel oil by which the solution of the nitro-cellulose and the linseed oil and plasticizers is insured.

The application of this solution to either or both sides of the film made from viscose forms a coating 2 which modifies the surfaces of the latter so that it is receptive to further adhesive coatings.

Such coatings of good adhesive properties may be formed from resin solutions, wax-free shellac, phenol formaldehyde resin, glycerol-phthalate resin or polymerized vinyl compounds (acetate or the like). These resins form ready solutions with suitable solvents such as alcohol, acetone, toluol and coal tar hydrocarbons.

Solutions such as have been just described form dry non-tacky films of resinous character which spread readily upon the nitro-cellulose-linseed oil coatings. The resinous coating 3 is extremely thin and practically invisible blending with the nitro-cellulose coating 2. The resin coating when heated becomes definitely adhesive.

The coatings 2 and 3 are applied to either or both of the surfaces of the film made from viscose I and thus produce the novel form of film having the greatly enhanced capacity of adherence.

I have shown a sheet material 4 to be of fibrous, paper, stranded or felted fabric or the like. This sheet would ordinarily be impossible of attachment to the film made from viscose. In other words, an unmodified film made from viscose cannot be permanently applied as a coating to this paper, fabric or the like. However, the use of intermediate coatings of nitro-cellulose and thermo-adhesive resins effectually serves to bond the film made from viscose to the paper.

In carrying out this bonding operation it is only necessary to apply the film made from viscose to the surface of the sheet material with momentary pressure and a slight degree of heat. This can be carried out by the heated roll, press or the like. The resin coating under this treatment becomes tacky or adherent and forms a firm bond between the sheet material and the coated film. The presence of the nitro-cellulose-linseed oil film completes the union between the resin and the cellulose which would otherwise not be permanent.

It will be evident that this method may be used for applying films made from regenerated cellulose in any form whether filaments, separate sheets, or continuous webs of film. It is also evident that the process may be carried on as an incident to printing, embossing, coating or other process for the production of sheet material articles.

By applying this coating to both sides of the film of regenerated cellulose either side of the latter may be applied to sheet material or both sides may be caused to adhere to separate sheets of material and thus form an interior membrane for a laminated sheet.

While the above description relates to the preferred form of my invention it has been set forth solely by way of example and without limitation of the invention other than in accordance with the scope of the appended claims.

What I claim is:—

1. The method of rendering a cellulose film adherent which consists in coating the film with a lacquer solution of nitro-cellulose and linseed oil, drying said coating and then applying a coating of resinous material, said resinous material having the property of becoming adherent under the influence of heat.

2. The method of rendering a cellulose film adherent which consists in coating the film with a lacquer solution of nitro-cellulose, linseed oil and a plasticizer, drying said coating and then applying a thin coating of thermo-adhesive resin, said film being adapted for application to other materials as coatings which may be bonded in continuous operation.

3. The method of rendering a film made from viscose adherent which consists in coating the film with a lacquer solution of nitro-cellulose, linseed oil and a plasticizer, drying said coating and then applying a thin coating of thermo-adhesive resin, said thermo-adhesive resin being non-tacky when dry.

4. The method of rendering a film made from viscose adherent which consists in coating the film with a lacquer solution of nitro-cellulose, linseed oil, a plasticizer and a gum or resin, drying said coating and then applying a thing coating of thermo-adhesive resin, said resinous material having the property of becoming adhesive and attaching itself to paper when subjected to substantially momentary pressure by means of a revolving heated roller.

5. The method of applying a film made from viscose to a sheet of material which consists in coating the film with a lacquer solution of nitro-cellulose and linseed oil, drying the coating, coating the film with a solution of a thermo-adhesive resin, and applying the coated film to a sheet of material with pressure.

6. The method of applying a film made from viscose to a sheet of material which consists in coating the film with a lacquer solution of nitro-cellulose and linseed oil, drying the coating, coating the film with a solution of a thermo-adhesive resinous compound, drying the coating and then applying the coated film to a sheet of material with heat.

7. The method of bonding a resinous layer to a film made from viscose which consists in coating the film with a lacquer solution of nitro-cellulose and linseed oil, drying said coating and applying the resinous layer to said dry coating.

8. The method of rendering a film made from regenerated cellulose adherent comprising coating the film on one or both sides with a lacquer solution comprising cellulose nitrate and drying oil, evaporating volatile solvent from said solution to form a firmly bonded water repellent dry layer thereon and then applying to one or both sides of the coated film a thin moisture-vapor repellent layer comprising solid synthetic resin adapted to become adhesive under the influence of heat.

9. The method of rendering a film made from regenerated cellulose adherent comprising coating the film on one or both sides with a lacquer solution comprising cellulose nitrate, drying oil and gum or resin, evaporating volatile solvent from said solution to form a firmly bonded water repellent dry layer thereon and then applying to one or both sides of the coated film a moisture-vapor repellent layer comprising solid synthetic resin adapted to become adhesive under the influence of heat.

10. The method of rendering a film made from regenerated cellulose adherent comprising coating the film on one or both sides with a lacquer solution comprising cellulose nitrate, linseed oil, homogenizer and compatible solvent, evaporating volatile solvent from said solution to form a firmly bonded water repellent dry layer thereon and then applying to one or both sides of the coated film a moisture-vapor repellent layer comprising resinous material adapted to become adhesive under the influence of heat.

11. A method of bonding a resinous layer to a film made of regenerated cellulose comprising coating the film with a lacquer solution comprising cellulose nitrate and drying oil, drying said coating and applying the resinous layer to said dry coating and drying said resinous layer.

12. A process of modifying one or both surfaces of a film of regenerated cellulose and firmly bonding a heat-and-pressure sensitive layer to one or both surfaces of said film, which includes applying to one or both surfaces of said film a solution comprising volatile solvent and compound adapted to modify the surface or surfaces of said film and form a firmly bonded dry layer thereon said compound comprising cellulose nitrate, linseed oil and gum or resin, evaporating volatile solvent from said solution to form said layer and applying to one or both sides of the dry coated film a coextensive non-tacky layer having the property of becoming adherent under the influence of heat, said layer comprising solid synthetic thermo-adhesive resin adapted to form a firm bond or weld with paper, stranded or felted fabric or other material.

13. A process of modifying one or both surfaces of a film of regenerated cellulose and firmly bonding a heat-and-pressure sensitive layer to one or both surfaces of said film, which includes applying to one or both surfaces of said film a solution of coating compound comprising cellulose nitrate, drying oil and compatible volatile solvent, said compound being adapted to modify the surface or surfaces of said film and form a firmly bonded water repellent dry layer thereon, evaporating volatile solvent from said solution to form said layer and applying to one or both sides of the dry coated film a coextensive non-tacky moisture-vapor repellent layer having the property of becoming adherent under the influence of heat, said layer comprising thermo-adhesive resin adapted to form a firm bond or weld with paper, stranded or felted fabric or other material.

14. A process of modifying one or both surfaces of a film of regenerated cellulose and firmly bonding a heat-and-pressure sensitive layer to one or both surfaces of said film, which includes applying to one or both surfaces of said film a solution of coating compound comprising cellulose nitrate, drying oil, placticizer and compatible volatile solvent, said compound being adapted to modify the surface or surfaces of said film and form a firmly bonded water repellent dry layer thereon, evaporating volatile solvent from said solution to form said layer and applying to one or both surfaces of the dry coated film a coextensive moisture-vapor repellent layer having the property of becoming adherent under the influence of heat, said layer comprising thermo-adhesive resin adapted to form a firm bond or weld with paper, stranded or felted fabric or other material.

15. A process of modifying both surfaces of a film of regenerated cellulose and firmly bonding a heat-and-pressure sensitive layer to one or both surfaces of said film, which includes applying to both surfaces of said film a solution of coating compound comprising cellulose nitrate, polymerized linseed oil and compatible volatile solvent, said compound being adapted to modify the surfaces of said film and form a firmly bonded water repellent dry layer thereon, evaporating volatile solvent from said solution to form said layers and applying to one or both surfaces of the dry coated film a coextensive moisture-vapor repellent layer having the property of becoming adherent under the influence of heat, said layer comprising thermo-adhesive vinyl resin adapted to form a firm bond or weld with paper, stranded or felted fabric or other material.

16. In a method of applying a film of regenerated cellulose to other material comprising coating the film on one or both sides with a closely adherent water repellent covering layer comprising cellulose nitrate and drying oil, drying the same, coating the film on one or both sides with a closely adherent moisture-vapor repellent resinous layer comprising thermo-adhesive resinous compound and applying the coated film to other material by means adapted to form a firm bond between said coated film and said material.

17. In a method of applying a film of regenerated cellulose to other material comprising coating the film on one or both sides with a closely adherent water repellent covering layer comprising cellulose nitrate, linseed oil and plasticizer, drying the same, coating the film on one or both sides with a closely adherent moisture-vapor repellent resinous layer comprising thermo-adhesive resinous compound and applying the coated film to other material by means of heat and pressure.

18. In a method of applying a film of regenerated cellulose to other material comprising coating the film on both sides with a closely adherent water repellent covering layer comprising cellulose nitrate, polymerized linseed oil and gum or resin drying the same, coating the film on one or both sides with a closely adherent moisture-vapor repellent resinous layer comprising thermo-adhesive resinous compound and applying the coated film to other material under the influence of a temperature and pressure adapted to form a firm bond between said coated film and said material.

19. In a method of bonding a sheet or film of regenerated cellulose to one or both sides of other material comprising coating the film on one or both sides with a closely adherent water repellent and moisture-vapor repellent covering layer comprising a cellulosic nitrate, polymerized linseed oil, and gum or resin, said oil being present in an amount substantially equal to the dry weight of the cellulosic nitrate, applying a second layer of water repellent and moisture-vapor repellent composition comprising thermo-adhesive resinous substance and applying the layer of thermo-adhesive substance in contact with other material.

20. A preformed film adapted for bonding to other material in continuous operation under the influence of heat and pressure, said film comprising a sheet or roll of film made from regenerated cellulose having a closely adherent covering layer on one or both sides thereof, said layer comprising compound adapted to modify the surface of said film said compound comprising cellulose nitrate, linseed oil and gum or resin, and an attached coextensive non-tacky layer bonded to said covering layer on one or both sides of said film, said layer comprising thermo-adhesive resinous compound adapted to form a firm bond or weld with paper, stranded or felted fabric or other material, said first named layer being adapted to improve the bond between said film and said resinous layer and render said film firmly adherent and normally inseparable after bonding of the resinous layer or layers to other material.

21. A preformed film adapted for bonding to other material in continuous operation under the influence of heat and pressure, said film comprising a sheet or roll of film made from regenerated cellulose having a closely adherent water repellent covering layer on one or both sides thereof, said layer comprising cellulose nitrate and drying oil, and an attached coextensive non-tacky moisture-vapor repellent layer bonded to said covering layer on one or both sides of said film, said layer comprising thermo-adhesive resinous compound adapted to form a firm bond or weld with paper, stranded or felted fabric or other material, said first named layer being adapted to improve the bond between said film and said resinous layer and render said film firmly adherent and substantially or normally inseparable after bonding of the resinous layer or layers to other material.

22. A film adapted for bonding to other material comprising a sheet or film made from regenerated cellulose having a closely adherent water repellent covering layer on one or both sides thereof said layer comprising cellulose nitrate, linseed oil and plasticizer, and a coextensive moisture-vapor repellent resinous layer bonded to said covering layer on one or both sides of said film, said layer comprising thermo-adhesive resinous compound adapted to form a firm bond or weld with paper, stranded or felted fabric or other material, said first named layer being adapted to modify the surface or surfaces of said film and improve the bond between said film and said resinous layer.

23. A film adapted for bonding to other material comprising a sheet of film made from regenerated cellulose having a closely adherent water repellent covering layer on both sides thereof, said layer comprising cellulose nitrate and polymerized linseed oil, and a coextensive moisture-vapor repellent resinous layer bonded to said covering layer on one or both sides of said film, said layer comprising thermo-adhesive resinous compound adapted to form a firm bond or weld with paper, stranded or felted fabric or other material, said first named layer being adapted to modify the surfaces of said film and improve the bond between said film and said resinous layer.

24. A sheet or film made from regenerated cellulose having a dry closely adherent covering layer on one or both sides thereof, said layer comprising low viscosity cellulose nitrate and linseed oil, said linseed oil being present in an amount substantially equal to the dry weight of the cellulose nitrate, said layer being adapted to modify the surface or surfaces of said film, said film being adapted thereby for coverage on one or both sides with a substantially permanently united thin layer of solid thermo-adhesive resin adapted to become adhesive under the influence of heat.

25. A sheet or film made from regenerated cellulose having a dry closely adherent covering layer on one or both sides thereof, said layer comprising cellulose nitrate, drying oil, and gum or resin, said layer being adapted to modify the surface or surfaces of said film, said film being adapted thereby for coverage on one or both sides with a substantially permanently united thin layer of solid thermo-adhesive resin adapted to become adhesive under the influence of heat.

26. A printed, embossed, decorated or plain sheet or strip of firmly bonded material, said material comprising a layer of film made from regenerated cellulose having a closely adherent water repellent covering layer on one or both sides thereof, said layer comprising a cellulose nitrate and drying oil, an attached coextensive closely adherent moisture-vapor repellent resinous layer bonded to said covering layer on one or both sides of said film, said resinous layer comprising thermo-adhesive resinous compound, and an attached closely adherent sheet or strip of paper, stranded or felted fabric or other material bonded to said resinous layer on one or both sides of said film.

27. A printed, embossed, decorated or plain sheet or strip of firmly bonded material, said material comprising a layer of film made from regenerated cellulose having a closely adherent water repellent covering layer on one or both sides thereof, said layer comprising cellulose nitrate, drying oil, and gum or resin, an attached coextensive closely adherent moisture-vapor repellent resinous layer bonded to said covering layer on one or both sides of said film, said resinous layer comprising thermo-adhesive resinous compound, and an attached closely adherent sheet or strip of paper, stranded or felted fabric or other material bonded to said resinous layer on one or both sides of said film.

28. A printed, embossed, decorated or plain sheet or strip of firmly bonded material, said material comprising a layer of film made from regenerated cellulose having a closely adherent water repellent covering layer on each side thereof, said layers comprising cellulose nitrate and polymerized linseed oil, an attached coextensive closely adherent moisture-vapor repellent resinous layer bonded to said covering layer on one or both sides of said film, said resinous layer comprising thermo-adhesive resinous compound, and an attached closely adherent sheet or strip of paper, stranded or felted fabric or other material bonded to said resinous layer on one or both sides of said film.

29. A printed, embossed, decorated or plain sheet or strip of firmly bonded material, said material comprising a layer of film made from regenerated cellulose having a closely adherent water repellent covering layer on one or both sides thereof, said layer comprising cellulose nitrate, linseed oil and a plasticizer, an attached coextensive closely adherent moisture-vapor repellent resinous layer bonded to said covering layer on one or both sides of said film, said resinous layer comprising thermo-adhesive compound, and an attached closely adherent sheet or strip of paper, stranded or felted fabric or other material bonded to said resinous layer on one or both sides of said film.

CLYDE SCOTT.